(12) United States Patent  (10) Patent No.: US 7,770,547 B2
Komurian et al.  (45) Date of Patent: Aug. 10, 2010

(54) REGULATING DEVICE OF THE WATER OUTLET CHAMBER TYPE

(75) Inventors: Richard Komurian, Turckheim (FR); Pascal Corduan, Walbach (FR)

(73) Assignee: Mark IV Systemes Moteurs (Societe Anonyme), Courbevoie (FR)

( * ) Notice: Subject to any disclaimer, the term of this patent is extended or adjusted under 35 U.S.C. 154(b) by 348 days.

(21) Appl. No.: 10/599,732

(22) PCT Filed: Apr. 7, 2005

(86) PCT No.: PCT/EP2005/051558

§ 371 (c)(1),
(2), (4) Date: May 30, 2007

(87) PCT Pub. No.: WO2005/098212

PCT Pub. Date: Oct. 20, 2005

(65) Prior Publication Data

US 2007/0245984 A1    Oct. 25, 2007

(30) Foreign Application Priority Data

Apr. 7, 2004    (FR) .................................. 04 03659

(51) Int. Cl.
*F01P 7/14* (2006.01)
(52) U.S. Cl. ................ 123/41.08; 123/41.1; 123/41.44; 251/333; 251/363; 236/46 R; 236/34.5; 236/92 B
(58) Field of Classification Search ................ 236/34.5, 236/46 R, 92 B; 251/333, 363; 144/75; 123/41.44, 41.31, 196 AB, 41.1, 41.33; 74/467, 74/606 A; *F01P 7/14*
See application file for complete search history.

(56) References Cited

U.S. PATENT DOCUMENTS

| 3,510,060 A | 5/1970 | Starmuhler |
| 3,858,800 A | 1/1975 | Wong |
| 4,426,036 A * | 1/1984 | Sliger ........................ 236/34.5 |
| 4,539,942 A | 9/1985 | Kobayashi et al. |
| 4,562,953 A * | 1/1986 | Duprez et al. .............. 236/34.5 |
| 6,520,418 B2 * | 2/2003 | Kunze et al. ............... 236/34.5 |
| 2003/0217775 A1 | 11/2003 | Cousineau et al. |

FOREIGN PATENT DOCUMENTS

FR         2864151       6/2005
WO      03/074911       9/2003

OTHER PUBLICATIONS

English language abstract of FR 2864151.

* cited by examiner

*Primary Examiner*—Devon C Kramer
*Assistant Examiner*—Keith Coleman
(74) *Attorney, Agent, or Firm*—Greenblum & Bernstein P.L.C.

(57) ABSTRACT

A water outlet chamber-type regulating device includes a chamber component having an inlet and an outlet for a fluid to be regulated, and including a member for regulating the flow, the member having a valve component translatingly movable and configured to close a passage cross-section between the inlet and the outlet, and is rigidly fixed to a control shaft. The chamber component includes at least one opening formed in its lateral wall, and the control shaft carries a second closing component, which is integral in translation with the shaft and is positioned on the shaft and has a shape that is configured to regulate the flow of water passing through the opening as a function of the regulation of the flow in the region of the passage cross-section.

18 Claims, 5 Drawing Sheets

REGULATING DEVICE OF THE WATER OUTLET CHAMBER TYPE

TECHNICAL FIELD

The present invention concerns the field of means for regulating the circulation of fluids, and relates to a regulating device of the water outlet chamber type, provided with a regulating member and a bypass fitting, and allowing the flow passing through an opening in the region of a bypass fitting to be regulated.

BACKGROUND ART

A bypass has the advantage of allowing part of the flow to be rerouted, without thereby disadvantaging the loss in pressure in the main circuit part. It is thus possible to obtain, in the case of motor vehicles, for example, a more rapid increase in the temperature of the fluid during starting. If the flow of fluid issuing from the engine is diverted towards a short-circuit loop fitted directly to the engine, a low volume of fluid passes through this loop, which causes the temperature of the fluid to rise rapidly. Then, once the fluid has reached a predetermined temperature, it may be provided to remove this bypass.

A water outlet chamber that is intended to direct the flow in a transverse direction, so as to be able to direct it towards a supplementary branch of a circuit, as well as in the longitudinal direction of the chamber, is presented in French patent application No. 03 15 204, in the name of the Applicant. Said chamber also comprises an opening formed in its constituent lateral wall, and contains an insert forming a conduit part inside the component, one of the end openings of which insert is located opposite and adjacent to said lateral opening, in the assembly position of said insert.

DISCLOSURE OF INVENTION

The present invention proposes to provide a different form of device allowing flow to be directed in longitudinal and transverse directions. It also proposes to provide a device that is suitable for regulating said flow, such that the flow having to pass through the transverse opening may be controlled precisely.

For this purpose, the present invention relates to a regulating device of the water outlet chamber type, in particular for a cooling circuit for the cylinder heads of an internal combustion engine, mainly comprising a chamber component having an inlet and an outlet for the fluid to be regulated, and including a member for regulating the flow passing through said chamber in a longitudinal direction thereof, said regulating member comprising a valve component, which is movable in translation in this direction, is intended to close in a controlled manner a passage cross-section between the inlet and the outlet, and is rigidly fixed to a control shaft having a longitudinal extension. The device is characterised in that the chamber component also comprises at least one opening, formed in its constituent lateral wall between the inlet and the outlet, and in that said control shaft carries a second closing component, which is integral in translation with said shaft, this second closing component having two surface supports forming flat, parallel, surface guiding surfaces, which cooperate with two corresponding flat surfaces located on the internal wall of the component, so as to form two flat surface pairs in sliding contact during the translation of the second closing component into the component, this second closing component being positioned on said shaft and having a shape that is configured to regulate the flow of water passing through the opening as a function of the regulation of the flow in respect of the passage cross-section.

BRIEF DESCRIPTION OF THE DRAWINGS

A better understanding of the invention will be facilitated by the following description, which relates to a preferred embodiment, given by way of a non-limiting example, and explained with reference to the accompanying schematic drawings, in which.

BEST MODE FOR CARRYING OUT THE INVENTION

Figure 1:
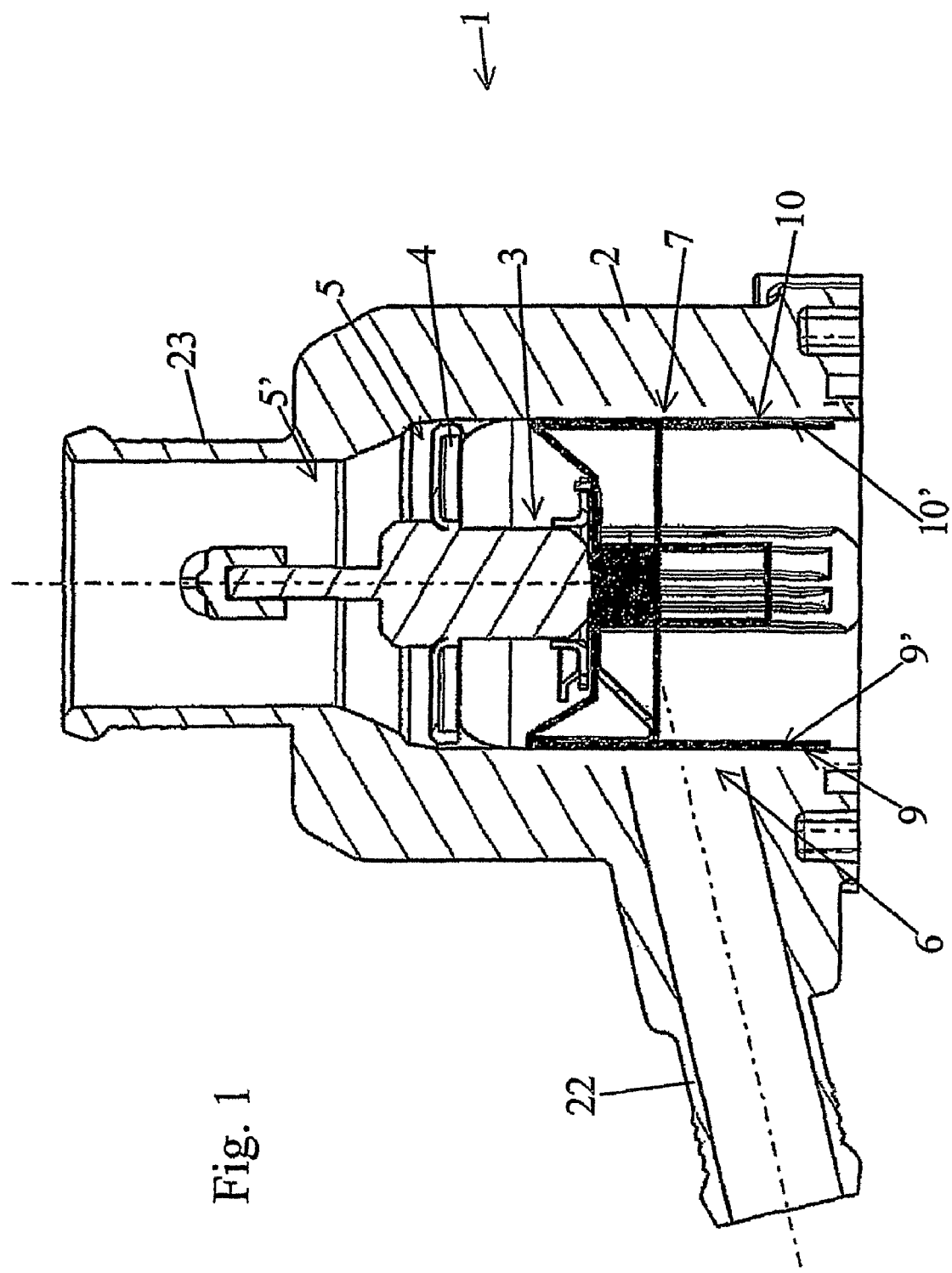
FIG. 1 is a longitudinal section of the device according to the invention.
Figure 2:
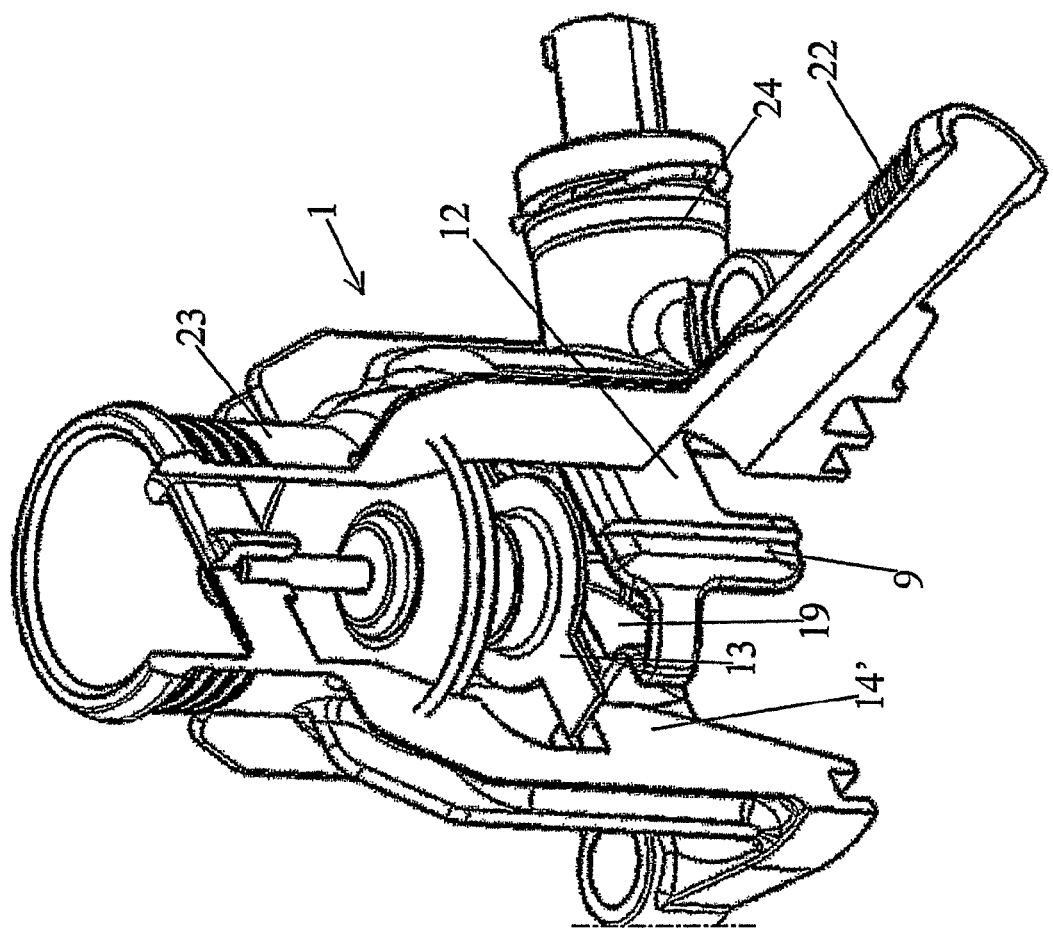
FIG. 2 is an exploded perspective view showing the device according to the invention.
Figure 3:
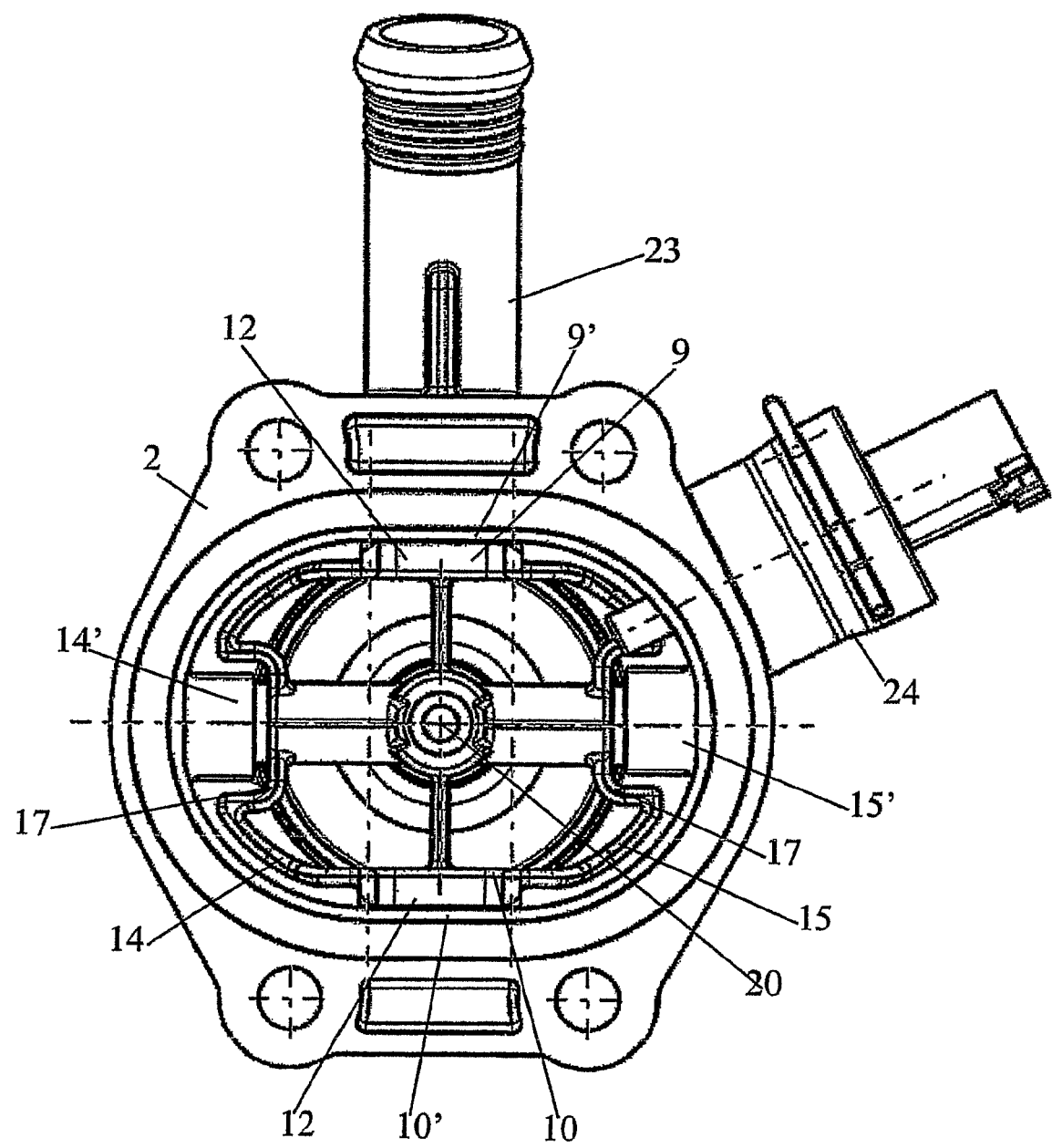
FIG. 3 is a view from below, from the outlet of the device according to the invention.
Figure 4:
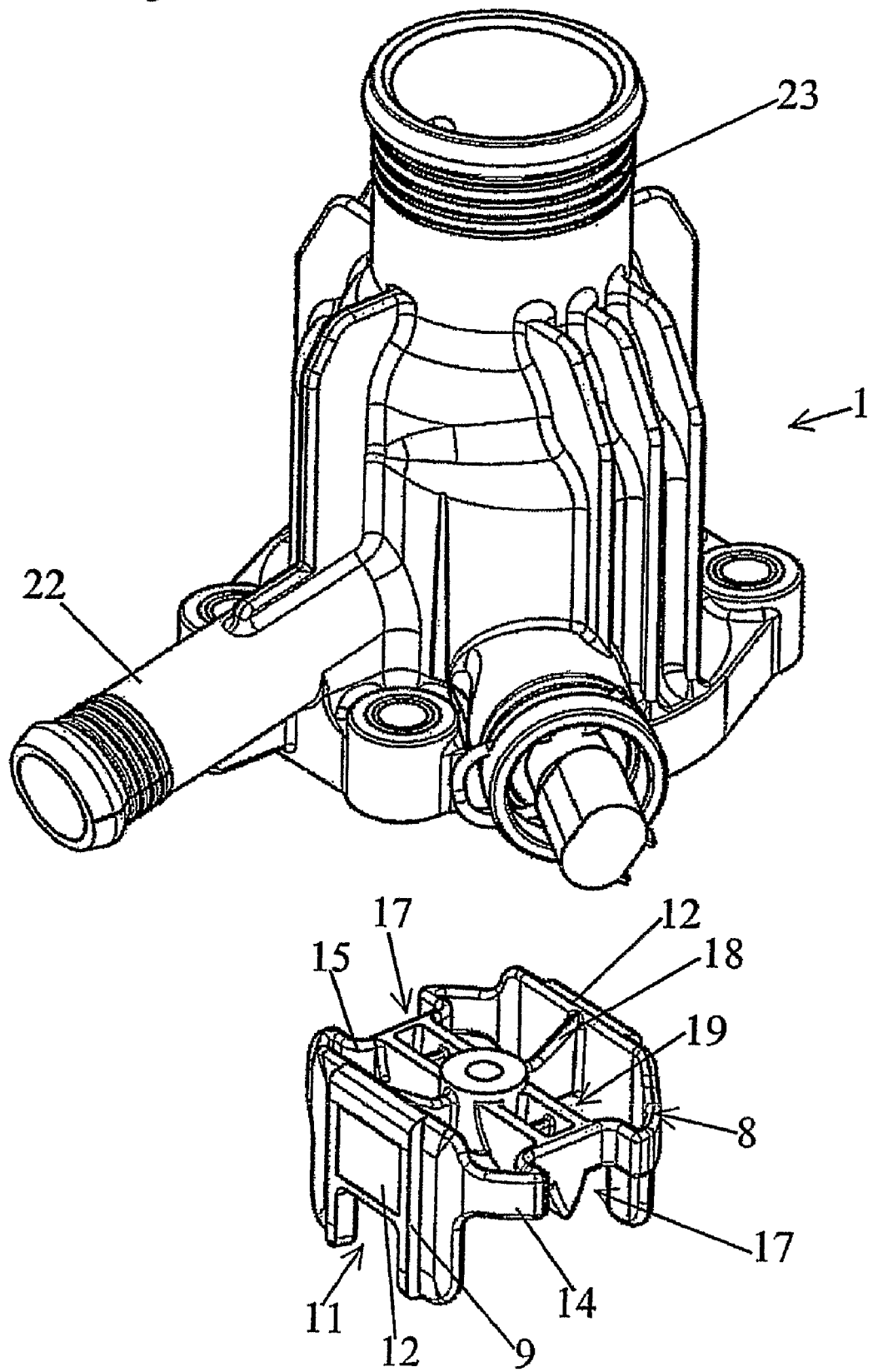
FIG. 4 is a perspective view showing the device according to the invention and the second closing component.

As the accompanying figures show, the regulating device of the water outlet chamber type according to the invention, in particular for a cooling circuit for the cylinder heads of an internal combustion engine, may mainly comprise a chamber component 2 having an inlet and an outlet for the fluid to be regulated, and including a member 3 for regulating the flow passing through said chamber in a longitudinal direction thereof, said regulating member 3 comprising a valve component 4, which is movable in translation in this direction, is intended to close in a controlled manner a passage cross-section between the inlet and the outlet, and is fixed to a control shaft x having a longitudinal extension.

According to one characteristic of the invention, the chamber component 2 may also comprise at least one opening 6, formed in its constituent lateral wall between the inlet and the outlet, and said control shaft X may carry a second closing component 7, which is integral in translation with said shaft X, this second closing component 7 having two surface supports 9, 10 forming flat, parallel, surface guiding surfaces, which cooperate with two corresponding flat surfaces 9', 10' located on the internal wall of the component 2, so as to form two flat surface pairs 9, 9' and 10, 10' in sliding contact during the translation of the second closing component 7 into the component 2, this second closing component 7 being positioned on said shaft X and having a shape that is configured to regulate the flow of water passing through the opening 6 as a function of the regulation of the flow in the region of the passage cross-section 5'.

It is thus possible to regulate gradually the flow passing through the chamber component 2, owing to the fact that the second closing component is connected to the activating shaft X, an activation of said shaft X by means of the regulating member causing the second closing component 7 to be activated. Moreover, and particularly advantageously, the regulation in the region of the opening 6 is a direct function of the regulation in the region of the passage cross-section 5'.

According to one characteristic of the invention, the variations in passing flow resulting from the displacement of the shaft X in the region of the passage cross-section 5' and in the region of the opening 6 may develop in the same way, such that the opening of the passage cross-section 5' by the movable valve component 4 causes the opening 6 to be released, and closing the passage cross-section 5' causes the opening 6 to be closed. In order to do this, the second closing component 7 has merely to be provided and positioned on the shaft X in such a way that, when the valve component 4 is in the closed position of the passage cross-section 5', the second closing component 7 is in the closed position of the opening 6, and when the valve component 4 is in the open position of the passage cross-section 5', after displacement of the shaft X, the second closing component 7 is also in the open position of the opening 6. In this case, the second closing component 7 is positioned facing the opening 6 when the valve component 4 is in the closed position of the passage cross-section 5', and the displacement of the shaft X to open the passage cross-section 5' causes the displacement of the second closing component 7, which then releases the passage of the flow in the region of the opening 6.

According to one variation of the invention, the variations in passing flow resulting from the displacement of the shaft X in the region of the passage cross-section 5' and in the region of the opening 6 develop in opposing manners, i.e. the opening of the passage cross-section 5' causes the opening 6 to close, and vice versa. In this case, the second closing component 7 is located above the opening 6, i.e. between said opening 6 and the valve component 4, when the valve component 4 is in the closed position of the passage cross-section 5', and when the passage cross-section 5' is opened by the valve component 4, the second closing component returns to its position for closing the opening 6.

Advantageously, the chamber component 2 may have a cylindrical general structure and an internal portion that is profiled by longitudinal segments, and the two surface supports 9, 10 may be connected to each other by a brace 18, the distance between the two supports being of such a length that the second closing component 7 is guided in translation into the chamber component 2, whilst being locked substantially in rotation with a slight clearance in the plane perpendicular to the shaft X, and about said shaft X. This slight clearance prevents the second sealer 7 from becoming locked in the chamber component 2 during a high flow, for example, which would hinder the functioning of the regulation.

In order to regulate the flow that is intended to pass through the lateral opening 6, one 9' of the two guiding surfaces of the component 2 may be located in the region of, and surrounds, the opening 6, and the guiding surface 9 may form a means for gradually closing the opening 6 and have a cut-out surface part 11. The shape of the cut-out surface part 11 may be selected as a function of the type of regulation. It is, for example, possible to provide a regulation such that the passage of the flow through the opening 6 is possible, in the case of a direct regulation, only from a certain opening in the passage cross-section 5'. In this case, a cut-out surface part that only faces the opening 6 from a corresponding predetermined displacement of the interlocking shaft X is selected. It is, of course, also possible to use the positioning of the second closing component 7, both on the shaft and relative to the opening 7, as a regulating parameter.

Characteristically, the two guiding surfaces 9, 10 may have a protruding excess thickness 12 forming a flat, prominent surface that is intended to limit the surface of contact between the guiding surfaces 9, 10 of the second closing component 7 and the internal wall of the component 2, so as to limit friction between said guiding surfaces 9, 10 and the internal wall of the component 2, whilst at the same time superficially guiding the second closing component 7 into the chamber component 2.

The brace 18 may be in the form of a tapered blade, and two other braces 14, 15 may connect the two guiding surfaces 9 and 10 by substantially matching the internal shape of the chamber component 2, so as to limit disruption of the flow passing through the chamber component 2. In order to limit losses in pressure and the possible emergence of eddies in the region of the second closing component 7, it is advantageous that the brace 18 has the smallest possible surface perpendicular to the flow. If said brace 18 is in the form of a tapered blade, in contrast, the structure of the second closing component must be reinforced, and a proportion of the forces exerted on the brace 18 must be transferred. This is done by means of the two braces 14 and 15, which may take on these forces, whilst at the same time reinforcing the structure of the second closing component 7.

According to one characteristic of the invention, a fourth brace 19, encompassing the hub 20 of the shaft X of the regulating member 3, may advantageously be provided to connect the braces 14 and 15 to each other, so as to stiffen the structure of the second closing component 7.

The regulating member 3 may advantageously be fixed to the internal wall of the chamber by means of a stress-retrieving stirrup 13, resting on two interior projections 14', 15' providing permanent support surfaces 16 for the stirrup 13 of said regulating member 3, each of the two braces 14 and 15 may have a recess 17 that is intended to cooperate with corresponding interior projections 14', 15' of the internal wall of the component 2, the brace 19 connecting the two braces 14 and 15 and the stress-retrieving stirrup 13 may be disposed, in the assembly position of the second closing component 7, on the regulating member 3, and the same exposed surface may be superimposed on said brace 19 and said stirrup 13 in the direction of flow, so as to limit losses in pressure of the fluid flow passing through the component 2.

The section of the brace 19, in the longitudinal direction, may decrease in the direction of flow, the transverse section of the brace 19 being substantially triangular, so as to allow the disruptions of the flow passing through the chamber component 2 to be further reduced.

The regulating member 3 may comprise a thermoactive or heat-responsive means, such as a wax cartridge, immersed in the fluid present in the component 2 and activating the translation of the valve component 4. This member must be disposed in the chamber component 2 in such a way that it is immersed in the fluid and reacts to the temperature of this fluid by activating the valve component 4. It is therefore preferably located between the valve component 4 and the second closing component 7.

Figure 5:
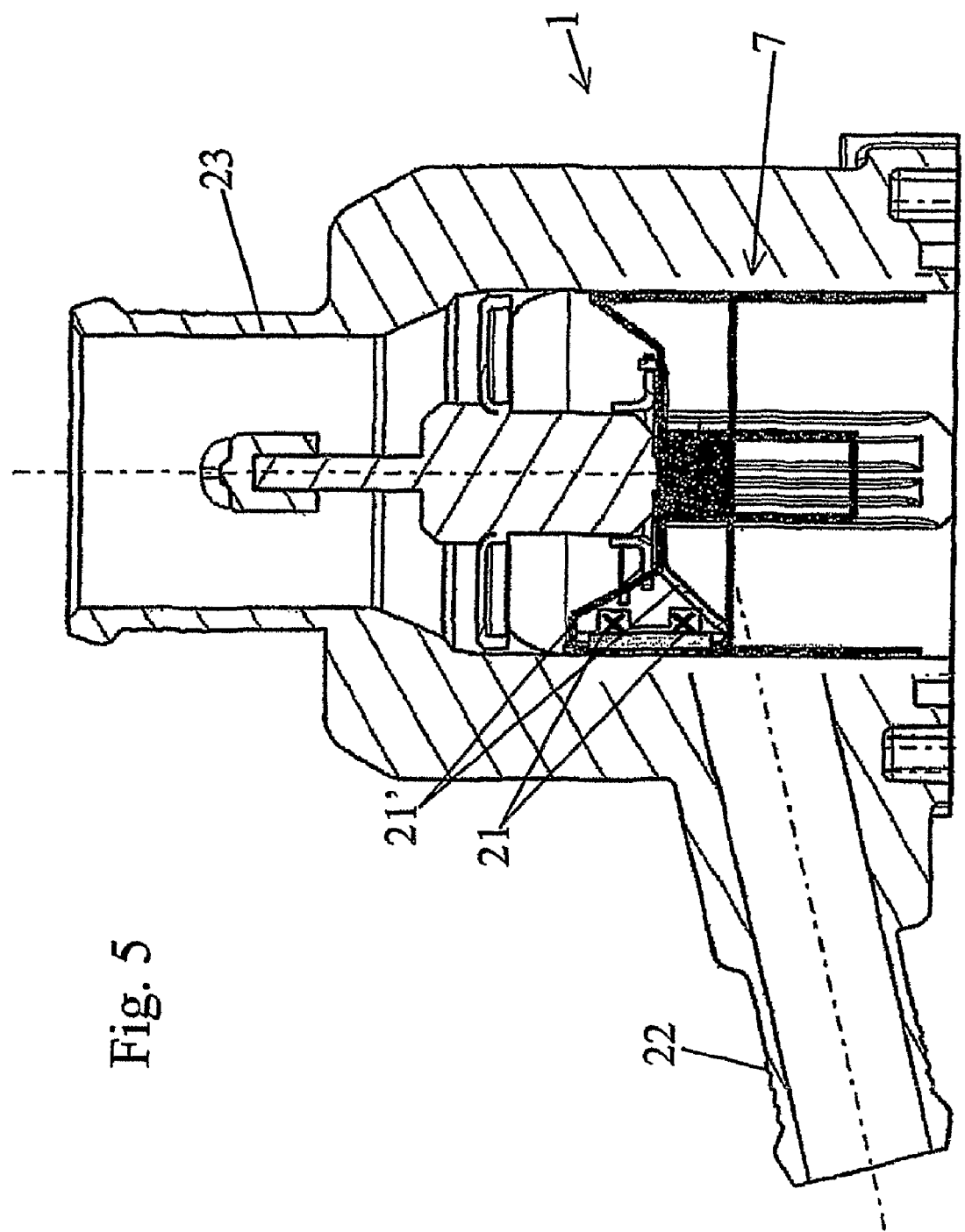
FIG. 5 is a longitudinal section of the device according to a variation of the invention.

According to a variation of the invention shown in FIG. 5, the second closing component 7 may have, in the region of the guiding surface 9 intended to slide along the flat surface 9' of the internal wall of the component having the lateral opening 6, at least one support element 21' for at least one corrugated gasket 21 intended to flatten the guiding surface 9 against the internal wall of the component 2, so as to increase the tightness between the second closing component 7 and the internal wall of the component 2, in the region of the lateral opening 6. This variation is particularly advantageous in the event of a high flux that would tend to destabilise the positioning of the second closing component in the chamber component 2.

Preferably, the second closing component 7 may be in the form of a frame 8 forming a ring, the section of which may be proportioned relative to the section of the chamber component 2, and having two wings forming the guiding surfaces 9, 10.

According to one characteristic of the invention, the chamber component 2 may have, in the region of the lateral opening 6, a pipe or pipette 22 forming an exterior conduit segment that is continuous with the second closing component 7.

Preferably, the regulating device 1 may have a pipe or exterior connection fitting 23 in the region of the opening of the passage merging into the chamber component 2.

The chamber component 2 may also have a second lateral opening, which is extended by an exterior pipe 24 that is intended to receive a temperature sensor.

According to yet another characteristic of the invention, so as to provide a supplementary bypass from the flow passing through the chamber component 2, the chamber component 2 may also comprise a second opening, formed in its constituent lateral wall, and a third closing component, which is integral in translation with the shaft X and is positioned on said shaft X, and has a shape that is configured to regulate the flow of water passing through the second opening as a function of the regulation of the flow in the region of the passage 5'. This second opening may be provided either on the same side as the first opening 6, relative to the valve component 4, or on the other side, as may said third closing component.

The invention is not, of course, limited to the embodiment described and illustrated in the accompanying drawings. Modifications are possible, in particular with regard to the constitution of the various elements or by substitution of technical equivalents, without thereby departing from the scope of protection of the invention.

The invention claimed is:

1. A fluid outlet chamber regulator for a cooling circuit of a cylinder head of an internal combustion engine, the chamber regulator comprising:
    a chamber component having an inlet and an outlet configured to regulate fluid, and the chamber component having at least one opening formed in an inner wall of the chamber component between the inlet and the outlet;
    a flow passage regulator which regulates a flow of the fluid passing through the chamber component in a longitudinal direction of the chamber regulator, the flow passage regulator having a valve movable in the longitudinal direction and configured to close a passage cross-section positioned between the inlet and the outlet of the chamber component, the valve being fixed to a longitudinally extending control shaft; and
    a closure configured to translate with the control shaft, the closure having two flat surface supports which extend parallel to two corresponding flat inner wall surfaces provided on the inner wall of the chamber component, wherein engagement between the two flat surface supports and the two corresponding flat inner wall surfaces provides two sliding contact surfaces as the closure translates within the chamber component, the closure being positioned on the shaft and having a shape configured to regulate the fluid flow passing through the opening in accordance with a regulation of the fluid flow through the passage cross-section, wherein
    during translation of the closure within the chamber component, the closure is locked against rotation.

2. The fluid outlet chamber regulator according to claim 1, wherein variations in fluid flow resulting from a displacement of the shaft in a region of the passage cross-section and in a region of the opening develop in the same way.

3. The fluid outlet chamber regulator according to claim 1, wherein variations in fluid flow resulting from a displacement of the shaft in a region of the passage cross-section and in a region of the opening develop in opposing manners.

4. The fluid outlet chamber regulator according to claim 1, wherein the chamber component has a generally cylindrical shape and an internal portion defined by longitudinally extending segments, and the surface supports of the closure being connected to each other by a brace, wherein a distance between the surface supports is of such a length that the closure is guided in translation into the chamber component.

5. The fluid outlet chamber regulator according to claim 4, wherein at least one of the surface supports is located in a region of, and surrounds, the opening, and wherein the at least one of the surface supports is configured to gradually close the opening and has a cut-out surface part.

6. The fluid outlet chamber regulator according to claim 4, wherein the surface supports have a protruding excess thickness forming a prominent flat surface configured to limit surface contact between the surface supports of the closure and the inner wall of the chamber component, so as to limit friction between the surface supports and the inner wall of the chamber component and simultaneously guide the closure within the chamber component.

7. The fluid outlet chamber regulator according to claim 4, wherein the brace comprises a first brace having a tapered blade, and wherein second and third braces connect the surface supports by substantially matching an internal shape of the chamber component, so as to limit disruption of fluid flow through the chamber component.

8. The fluid outlet chamber regulator according to claim 4, wherein a fourth brace, encompassing the hub of the shaft of the flow passage regulator, is provided to connect the second and third braces to each other, so as to stiffen the structure of the closure.

9. The fluid outlet chamber regulator according to claim 8, wherein the flow passage regulator is fixed to the inner wall of the chamber component via a stress-retrieving stirrup, the stirrup resting on two interior projections which provide permanent supporting surfaces for the stirrup, each of the first and second braces have a recess configured to cooperate with corresponding interior projections of the inner wall of the chamber component, wherein the fourth brace connecting the first and second braces and the stress-retrieving stirrup is disposed, in the assembly position of the closure, on the flow passage regulator, and a same exposed surface is superimposed on said fourth brace and said stirrup in the direction of flow, so as to limit losses in pressure of the fluid flow passing through the component.

10. The fluid outlet chamber regulator according to claim 9, wherein a section of the fourth brace, in the longitudinal direction, decreases in the direction of flow, and wherein the cross-section of the fourth brace is substantially triangular.

11. The fluid outlet chamber regulator according to claim 1, wherein the flow passage regulator comprises one of a thermoactive and heat-responsive component immersed in the fluid present in the chamber component and activating the translation of the valve.

12. The fluid outlet chamber regulator according to claim 1, wherein the closure has, in a region of the surface supports intended to slide along a corresponding one of the flat inner wall surfaces of the chamber component having the lateral opening, at least one support element for at least one corrugated gasket configured to flatten the surface supports against the inner wall of the chamber component, so as to increase the tightness between the closure and the internal wall of the component, in the region of the lateral opening.

13. The fluid outlet chamber regulator according to claim 1, wherein the closure is in the form of a frame forming a ring, the section of which is dimensioned relative to the section of the chamber component, and having two wings forming the surface supports.

14. The fluid outlet chamber regulator according to claim 1, wherein the chamber component has, in the region of the lateral opening, a pipe forming an exterior conduit segment that is continuous with the closure, thereby providing a bypass fitting towards a new circuit loop or branch.

15. The fluid outlet chamber regulator according to claim 1, further comprising one of a pipe and exterior connection fitting in the region of the opening of the passage merging into the chamber component.

16. The fluid outlet chamber regulator according to claim 1, wherein the chamber component also has an additional lateral opening, which is extended by an exterior pipe configured to receive a temperature sensor.

17. The fluid outlet chamber regulator according to claim 1, wherein the chamber component also comprises an additional opening, formed in its lateral wall, and a closure component, which is integral in translation with the shaft and is positioned on the shaft, and has a shape that is configured to regulate the flow of fluid passing through the additional opening as a function of the regulation of the flow in the region of the passage.

18. The fluid outlet chamber regulator according to claim 1, wherein the chamber component is stationary.

* * * * *